United States Patent Office 3,497,343
Patented Feb. 24, 1970

---

3,497,343
METHOD OF STUNTING PLANT GROWTH WITH SUBSTITUTED HYDRAZONIUM SALTS
Johann Jung, Limburgerhof, Pfalz, and Karl-Heinz Koenig, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 513,536, Dec. 13, 1965. This application July 29, 1968, Ser. No. 748,214
Claims priority, application Germany, Dec. 22, 1964, B 79,855
Int. Cl. A01n *5/00*
U.S. Cl. 71—76                                6 Claims

ABSTRACT OF THE DISCLOSURE

Method of stunting plant growth by treating the plant or the soil in which the plant is growing with a compound of the formula

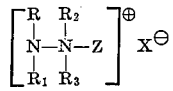

in which R, $R_1$, $R_2$ and $R_3$ represent hydrogen, methyl or ethyl, Z denotes an aliphatic or haloaliphatic radical of 1 to 4 carbon atoms and X is a non-phytotoxic anion in an amount sufficient to cause stunting without withering or substantially damaging the blossom or fruit of the plant.

---

This application is a continuation-in-part of application Ser. No. 513,536, filed on Dec. 13, 1965.

This invention relates to a method for regulating the growth of crop plants with hydrazine derivatives without their withering.

In particular the invention relates to a method for reducing the growth height of cereal plants so that they do not lodge prior to reaping. Moreover, the method according to this invention is suitable for reducing the growth height of ornamental plants, particularly flowers, and especially flowers which grow in a place where there is not sufficient light.

It is an object of the invention to provide a method of regulating plant growth, particularly for inhibiting growth height, without damaging the blossom or fruit of these plants.

It is known that chlorocholine chloride (CCC) may be used for regulating plant growth. Its action is not wholly satisfactory.

We have now found that compounds having the formula

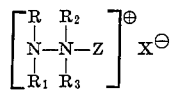

in which R, $R_1$, $R_2$ and $R_3$ may be identical or different and may denote hydrogen or the methyl or ethyl radical and Z denotes an alkyl radical having one to four carbon atoms which may bear chlorine, bromine, lower carboxyl groups, lower carboxyalkyl groups, lower alkoxy groups or a hydroxyl group as a substituent or an unsaturated aliphatic radical with two to four carbon atoms which may bear halogen, especially chlorine, as substituent and X denotes the anion of an inorganic or organic acid, cause a reduction in the height growth of many plants, particularly cereals, such as wheat, rye, barley and oats, and also of dicotyledons (for example sunflowers and tomatoes) and various ornamental plants, such as poinsettias and chrysanthemums.

The treated plants accordingly exhibit a compact habit; moreover a darker color of the leaves is to be observed.

The action of the compounds is attributable to the cation so that any anion may be chosen. Anionic phytotoxic acids should not be used however if it is desired only to regulate plant growth and not to destroy the plants. Examples of suitable acids are: hydrochloric acid, hydrobromic acid, sulfuric acid, carbonic acid, nitric acid, phosphoric acid, acetic acid, propionic acid, benzoic acid, monomethyl sulfate, monoethyl sulfate, 2-ethylhexanoic acid, acrylic acid, maleic acid, succinic acid, adipic acid, formic acid, chloroacetic acid, p-toluene sulfonic acid and benzenesulfonic acid.

The compounds may be supplied to the plants either through the soil or, by spraying, via the leaves.

They may also advantageously be used mixed with conventional fertilizers and plant protection agents and other carriers. Wetting agents may be incorporated to increase effectiveness. In addition to treatment of the soil and leaves, the seeds may be soaked. Owing to the relatively high plant compatibility, the rate of application may vary widely, for example up to 15 kg. of active substance per hectare. Amounts of 0.5 to 5 kg. per hectare are however usually regarded as adequate.

Production of the new compounds may be carried out by various methods. In general the starting material is a hydrazine which has already been partly or completely alkylated, and this is reacted with a large excess of an alkyl halide; in the case of partly alkylated hydrazines, the new substituted or unsubstituted alkyl radical therefore in general becomes attached to the nitrogen atom bearing most alkyl groups, for example

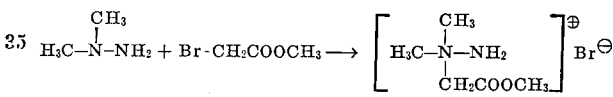

Another possibility is adding on alkylene oxides to hydrazines or alkylhydrazines, for example:

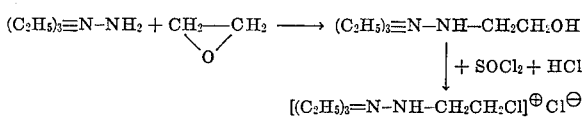

The haloalkyl hydrazonium salts may in turn be used for the production of other types of substituted hydrazonium salts, for example by eliminating hydrogen halide or by nucleophilic aliphatic substitution.

Many of the quaternary hydrazonium salts are strongly hygroscopic.

The production of one of the compounds according to this invention will now be described by way of example:

90 parts by weight of N,N-dimethylhydrazine is dripped at 70° to 80° C. with good stirring into an excess (1,300 parts by weight) of 1,2-dichloroethane. The reaction is exothermic. The whole is allowed to react further for one to two hours and the crystalline product is suction filtered. N,N-dimethyl-(β-chloroethyl) - hydrazonium chloride is obtained which has a melting point of 116° to 117° C. after is has been recrystallized from a mixture of alcohol and ethyl acetate. Excess 1,2-dichloroethane may be used again for another reaction after it has been separated from the hydrazonium chloride.

The other compounds may be prepared in an analogous way. The following compounds having the formula

in which R, $R_1$, $R_2$, $R_3$, Z and X have the meanings indicated in the following table are examples of other active substances. The following abbreviations are used:

M=methyl; E=ethyl; P=propargyl; β-BE=β-bromoethyl; MA=methallyl; β-CE=β-chloroethyl; A=allyl; δ - CB=δ - chlorobutyl; β-MCM=β-methylenecarboxymethyl; IP=isopropyl; β - ME=β - methoxyethyl; CM=chloromethyl; 2-CA=2-chloroallyl. The final column gives the melting point in ° C.

TABLE

| R | $R_1$ | $R_2$ | $R_3$ | Z | X | M.P. |
|---|---|---|---|---|---|---|
| H | H | M | M | P | Chloride | 127–129 |
| H | H | M | M | β-BE | do | 133–134 |
| H | H | M | M | MA | do | 107–108 |
| H | H | M | M | β-CE | do | 116–117 |
| M | M | H | H | β-CE | do | ca. 130–138 |
| H | H | E | E | β-CE | do | 120–123 |
| H | H | M | M | E | do | 216–217 |
| H | H | M | M | A | do | 52–53 |
| H | H | M | M | δ-CB | do | 185–188 |
| H | H | M | M | β-MCM | Bromide | 90–92 |
| H | H | M | M | IP | do | 246–247 |
| H | H | M | M | β-ME | do | 89–90 |
| H | H | M | M | CM | Chloride | 116–117 |
| H | H | M | M | A | Bromide | 109–111 |
| H | H | M | M | 2-CA | Chloride | 49–50 |

The following examples illustrate the effect of N-chloroethyl-N,N-dimethylhydrazonium chloride (CMH) on various plants, compared with the effect of chlorocholine chloride (CCC).

EXAMPLE 1

Rye plants are planted in a loamy sandy soil in glass vessels having a diameter of 11.5 cm. with appropriate dosage of nutrient. At a growth height of about 7 cm., the plants are sprayed with an aqueous solution equivalent to 6 kg. per hectare of active substance. The differences in the height growth of the plants six weeks after the treatment may be seen from the figures given below:

| Treatment | Height of plants | |
|---|---|---|
| | In cm. | Relative |
| Untreated | 17.2 | 100 |
| CCC 6 kg./ha | 17.4 | 102 |
| CMH 6 kg./ha | 14.5 | 84 |

EXAMPLE 2

Oats plants are planted under the same conditions as in Example 1. The active substances to be tested are introduced into the soil as an aqueous solution on the day on which the plants are sown. Six weeks later, the following action can be established:

| Treatment | Height of plants | |
|---|---|---|
| | In cm. | Relative |
| Untreated | 30.9 | 100 |
| CCC 12 kg./ha | 29.1 | 94 |
| CMH 12 kg./ha | 26.5 | 86 |

EXAMPLE 3

Summer barley is treated under the same conditions as in Example 2 with 12 kg./ha. of CMH and the same amount of CCC in the form of aqueous solutions. The effect of the agents used after 6.5 weeks may be seen below:

| Treatment | Height of plants | |
|---|---|---|
| | In cm. | Relative |
| Untreated | 31.1 | 100 |
| CCC | 27.8 | 89 |
| CMH | 27.5 | 82 |

EXAMPLE 4

Wheat plants are sown under the same conditions as in Example 1. Treatment is carried out both via the soil on the day of sowing and as a leaf spray on the plants which are about 7 cm. in height. The results 7.5 and 6.5 weeks after the treatment are shown in the following tables:

| Soil Treatment | Height of plants | |
|---|---|---|
| | In cm. | Relative |
| Untreated | 20.6 | 100 |
| CCC 3 kg./ha | 18.9 | 92 |
| CCC 12 kg./ha | 15.3 | 74 |
| CMH 3 kg./ha | 16.9 | 82 |
| CMH 12 kg./ha | 14.8 | 72 |

| Spray Treatment | Height of plants | |
|---|---|---|
| | In cm. | Relative |
| Untreated | 20.6 | 100 |
| CCC 6 kg./ha | 17.2 | 84 |
| CCC 9 kg./ha | 17.6 | 85 |
| CMH 6 kg./ha | 16.7 | 81 |
| CMH 9 kg./ha | 16.7 | 81 |

EXAMPLE 5

Comparison of the activity of various active substances is carried out in a vegetation test in Mitscherlich vessels. The soil used is a loamy sand having a pH value of 7.0; elutriatable fraction 19.7%; sorption capacity (T-value) 7.66 mval./100 g. of soil. Fertilizing: 1 g. of N as ammonium nitrate 1 g. of $P_2O_5$ as secondary potassium phosphate
1.33 g. of $K_2O$ as secondary potassium phosphate
Test plants: spring wheat.

31 grains of wheat are sown in the prepared vessels (later to be thinned out to fourteen plants). Immediately after sowing, the substances to be tested are applied at the rate of 9.42 mg. per Mitscherlich vessel, equivalent to 3 kg. per hectare. During the test period, supply of water is kept at 60% of the maximum water capacity of the soil.

Measurement of the length of the haulm, carried out on the mature plants, gives the following values for the individual compounds:

| Compound used | Length of haulm | |
|---|---|---|
| | Absolute | Realtive |
| Control (untreated) | 90.8 | 100 |
| CCC | 83.3 | 91.7 |
| CMH | 70.7 | 77.9 |
| N,N-dimethyl-N-(β-bromoethyl)-hydrazonium bromide | 71.7 | 79.0 |
| N,N-dimethyl-N-allylhydrazonium chloride | 77.0 | 84.8 |
| N,N-dimethyl-N-isopropylhydrazonium bromide | 72.3 | 79.6 |

As may be seen from the above results, the hydrazonium derivatives tested in this experiment exhibit an action which is clearly superior to that of CCC.

In further tests it has also been established that N,N-dimethyl-N-isopropylhydrazonium chloride, N,N-dimethyl-N-(β-methylallyl)-hydrazonium chloride, N,N-dimethyl-N-propargylhydrazonium chloride and N,N-dimethyl-N-ethylhydrazonium bromide are biologically active in the same way as the above-mentioned hydrazine derivatives.

We claim:
1. A method of stunting plant growth which comprises applying to said plant or to the soil in which the plant grows a compound of the formula

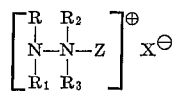

wherein R, $R_1$, $R_2$ and $R_3$ each represent a substituent selected from the group consisting of hydrogen, methyl and ethyl, Z represents a substituent selected from the group consisting of an alkyl or alkenyl radical of 1 to 4 carbon atoms and the bromo- and chloro-substituted alkyl or alkenyl radicals of 1 to 4 carbon atoms and X represents the anion of a non-phytotoxic organic or inorganic acid, said compound being applied in an amount sufficient to stunt the growth of the plant without withering or substantially damaging the blossom or fruit of the plant.

2. A method as claimed in claim 1 wherein said compound is applied in an amount of about 0.5 to 15 kg. per hectare.

3. A method as claimed in claim 1 wherein said compound is N-chloroethyl-N,N-dimethylhydrazonium chloride.

4. A method as claimed in claim 1 wherein said compound is N,N-dimethyl-N-($\beta$-bromoethyl)-hydrazonium bromide.

5. A method as claimed in claim 1 wherein said compound is N,N-dimethyl-N-allylhydrazonium chloride.

6. A method as claimed in claim 1 wherein said compound is N,N-dimethyl-N-isopropyl-hydrazonium bromide.

References Cited

UNITED STATES PATENTS

| | | | |
|---|---|---|---|
| 2,885,399 | 5/1959 | Omietanski | 260—583 |
| 2,901,886 | 9/1959 | Doerner | 260—583 |
| 2,955,108 | 10/1960 | Omietanski et al. | 260—205 |
| 3,083,229 | 3/1963 | Oja | 260—583 |
| 3,098,017 | 7/1963 | Walter et al. | 260—583 |
| 3,156,554 | 11/1964 | Tolbert | 71—76 |
| 3,156,555 | 11/1964 | Tolbert | 71—76 |
| 3,188,363 | 6/1965 | Amidon et al. | 260—863 |
| 3,197,504 | 7/1965 | Harvey | 71—121 |
| 3,240,799 | 3/1966 | Hageman et al. | 71—76 |
| 3,395,009 | 7/1968 | Oettel | 71—76 |

FOREIGN PATENTS 1,461,144  10/1966  France.

OTHER REFERENCES

Omietanski et al.: "Reaction of Chloramide etc." (1956), CA 50, pp. 13024–25 (1956).

Westphal: "Invert Soaps" (1941), CA 35, pp. 6958–59 (1941).

Ciba Ltd.: "Quaternary Ammonium Compounds, etc." (1964), CA 64, p. 2221 (1966).

LEWIS GOTTS, Primary Examiner

G. HOLLRAH, Assistant Examiner

U.S. Cl. X.R.

71—86, 103, 113, 115, 121; 260—501.15, 583

PO-1050
(5/69)

UNITED STATES PATENT OFFICE
CERTIFICATE OF CORRECTION

Patent No. 3,497,343   Dated February 24, 1970

Inventor(s) Johann Jung et al

It is certified that error appears in the above-identified patent and that said Letters Patent are hereby corrected as shown below:

Column 2, line 62, "is" should read --it--.

Column 4, line 43, "Realtive" should read --Relative--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents